US012410646B2

(12) United States Patent
Brown

(10) Patent No.: US 12,410,646 B2
(45) Date of Patent: Sep. 9, 2025

(54) REMOVABLE LOCK SYSTEM

(71) Applicant: Roberta Brown, Summerville, SC (US)

(72) Inventor: Roberta Brown, Summerville, SC (US)

(73) Assignee: Roberta Brown, Summerville, SC (US)

( * ) Notice: Subject to any disclaimer, the term of this patent is extended or adjusted under 35 U.S.C. 154(b) by 44 days.

(21) Appl. No.: 17/306,140

(22) Filed: May 3, 2021

(65) Prior Publication Data

US 2021/0340795 A1 Nov. 4, 2021

Related U.S. Application Data

(60) Provisional application No. 63/018,736, filed on May 1, 2020.

(51) Int. Cl.
*E05B 45/00* (2006.01)
*E05C 19/00* (2006.01)

(52) U.S. Cl.
CPC ............ *E05C 19/003* (2013.01); *E05B 45/00* (2013.01); *E05Y 2900/132* (2013.01)

(58) Field of Classification Search
CPC ........ E05C 19/003; E05C 19/00; E05B 45/00; E05B 2045/063; E05B 63/0004; E05B 65/0032; E05Y 2900/132
See application file for complete search history.

(56) References Cited

U.S. PATENT DOCUMENTS

| | | | | |
|---|---|---|---|---|
| 4,852,921 A * | 8/1989 | Gilbert | E05C 19/003 | 292/259 R |
| 5,139,292 A * | 8/1992 | Beals | E05B 65/108 | 292/92 |
| 5,605,364 A * | 2/1997 | Shelledy | E05C 19/003 | 292/259 R |
| 5,899,509 A * | 5/1999 | Ferguson | E05C 19/003 | 292/259 R |
| 6,394,510 B1 * | 5/2002 | Stewart, III | E05B 65/0888 | 292/264 |
| 6,553,797 B2 * | 4/2003 | Witchey | B60R 25/00 | 70/237 |
| 10,787,844 B2 * | 9/2020 | Keller | E05C 19/003 | |
| 11,268,309 B2 * | 3/2022 | Kemp | E05C 19/003 | |
| 2014/0361551 A1 * | 12/2014 | Rickman | E05C 19/186 | 292/155 |
| 2016/0108644 A1 * | 4/2016 | Igarashi | E05G 1/00 | 292/342 |
| 2018/0209187 A1 * | 7/2018 | Lowe | E05C 19/003 | |

* cited by examiner

*Primary Examiner* — Kristina R Fulton
*Assistant Examiner* — Thomas L Neubauer
(74) *Attorney, Agent, or Firm* — Troutman Pepper Locket LLP; Ryan A. Schneider; Harrison D. Lawrence

(57) ABSTRACT

A device that can be used as a second line of security to a primary door lock that sounds an alarm to notify the occupants of an unauthorized entry attempt. The device is durable, convenient, lightweight, and has a durable small circular plastic buzzer on an elongated arm/bar of the device, which buzzer stays out of view yet alarms the occupants of intruders as well as provides a sense of security for anyone traveling to hotels, motels, dorms, houses, apartment, schools, daycares or anywhere an extra line of security may be needed.

19 Claims, 5 Drawing Sheets

REMOVABLE LOCK SYSTEM

CROSS-REFERENCE TO RELATED APPLICATIONS

This application claims benefit under 35 USC § 119(e) of U.S. Provisional Patent Application No. 63/018,736 filed 1 May 2020, the entirety of which is incorporated herein by reference as if set forth herein in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

This disclosure relates generally to a security system for entrance barriers, and more particularly to an improved security system to prevent unwanted ingress through a door-like structure.

2. Description of Related Art

Hotels, motels and other transient residential establishment are constantly confronted with the problem of assuring that their guests are secure in their rooms and that no unauthorized persons will be able to gain access to such rooms when the guests are away. When guests are in their rooms, they are able to use the dead bolt locks or chains usually provided to prevent entry.

It would be unduly burdensome for all concerned, however, to require guests to use double keys or submit to tedious identification procedures as an expedient for thwarting would-be thieves or intruders when the guests are not in their rooms. Therefore, continuing efforts have been made to find ways and means of preventing guest room doors from being opened, other than with keys intended for that purpose.

It would be beneficial to have a simplified system of useful as a second line of security for unauthorized entry, as the door main locks are those primarily useful to keep out unauthorized entry.

Almost invariably, doors to guest rooms open inwardly. Such doors are provided with spring-loaded latches which engage in suitably aligned apertures in cooperating striker plates on the door jambs. The spring-loaded latch or bolt is provided on the side which first contacts the striker plate with an oblique or slanted face so that as the door is closed, the bolt is caused to retract by reason of the striker plate pressure on the slanted face until the bolt is in position opposite the cooperating aperture in the striker plate, when spring pressure causes the bolt to be thrust into the aperture. The opposite face of the bolt is not slanted, so that in order to operate the retraction mechanism, it is necessary to turn the doorknob engaged therewith to disengage the bolt from the aperture. Normally, the retraction mechanism can be operated only from inside the room without a key. From the outside, it is necessary to use a key to cause the bolt to retract from the striker plate.

The big problem with such locks has been the fact that there is usually enough space between the door and the striker plate, and the trim on the door jamb against which the door is engaged when it is closed, to enable a dexterous person to insert jimmying tools, shims or even flexible plastic credit cards in that space in such a manner as to exert pressure on the slanted face of the bolt and it to retract, thus becoming disengaged from the aperture in the striker plate and allowing the door to be opened.

Furthermore, it is well known that burglars and other individuals desiring to make an unauthorized entry through a locked door often gain entry by inserting a flexible tool, such as a strip of plastic or of thin metal or a jimmy bar between a closed door and the door jamb and then work the flexible tool to force the lock bolt or latch away from the door jamb and back into the door so that the door is free to open.

A number of devices have been developed in an effort to combat the problem of unauthorized entry through locked doors. The devices available today have had the following drawbacks: some are quite complicated and expensive to make; others require extensive modification of the doors or door jambs in order to be installed and none of the devices provide adequate protection against unauthorized entry by force which splits the lock mechanism away from the door and doorjamb.

Therefore, there is a need for a device that is portable, easy to install, durable enough to be useful as a secondary lock/barrier to entry, and includes an alarm that when the door comes in contact with an elongated arm/bar of the device, a high pitch sound is activated to alert the occupants. There is a further need for a lock device where the alarm portion is hidden out of view once the device is mounted for use. There is a further need for a lock device with an adjustment range that it can work regardless of the presence/size of gaps in the door.

It is an object of the present invention to provide such a lock device.

BRIEF SUMMARY OF THE INVENTION

Briefly described, according to exemplary embodiments of the present invention, an improved security system for an entrance barrier, such as, but not limited to a door, doors or door-like structured comprises a removable and portable door frame connection assembly that releasably secures the system to an entryway. The improved system further comprises a slidable extension to span an adequate distance to interrupt door opening, and an alarm assembly that presents the user with an alarm when unauthorized entry is attempted.

In another exemplary embodiment, the present invention can be a device that can be used as a second line of security to the primary door locks that sounds an alarm to notify the occupants of an unauthorized entry attempt. The device can be durable, convenient, lightweight, and has a durable small circular plastic buzzer on an elongated arm/bar of the device, which buzzer stays out of view yet alarms the occupants of intruders as well as provides a sense of security for anyone traveling to hotels, motels, dorms, houses, apartment, schools, daycares or anywhere an extra line of security may be needed.

The lock system device can further include gel inserts or coverings that are disposable or reusable that enable the user the option to place them on the right and left lips on the body of the device to limit, if not prevent, damage to the door frame when mounting the device.

The device can be further capable of both horizontal and transverse positional use, where the device allows for right and left lips, providing extra time to an occupant to escape or to retrieve a weapon to defend themselves or family.

In another exemplary embodiment, the present invention can be a lock system for a closure comprising a frame connection assembly, a slidable extension assembly, and an alarm assembly, wherein the frame connection assembly can be releasably securable to a jamb of an entryway, wherein the slidable extension assembly can be configured to span a distance to interrupt the entryway's closure in an opening direction, and wherein the alarm assembly can be configured to provide an alarm with an unauthorized movement of the closure in the opening direction.

The closure can be a door. The door can be hingedly connected to the entryway. The opening direction can be a direction into a room.

In another exemplary embodiment, the present invention can be a lock system for a door comprising a frame connection assembly comprising a durable cylindrical boxed shape body having at least one aperture, a slidable extension assembly comprising an elongate extension bar with apertures, a lockable adjustment assembly configured to lock the relative position of the elongate extension bar with the frame connection assembly, and an alarm assembly, wherein the frame connection assembly can be releasably securable to a jamb of an entryway, wherein the slidable extension assembly can be configured to span a distance to interrupt the entryway's door in an opening direction into a room, and wherein the alarm assembly can be configured to provide an alarm with an unauthorized movement of the door in the opening direction.

The lockable adjustment assembly can comprise a screw and wingnut, the screw extendible through one aperture of the durable cylindrical boxed shape body and one aperture of the elongate extension bar.

The lock system can further comprise a set of inserts fittable between the connection of the durable cylindrical boxed shape body and the door jamb. The inserts can comprise gel.

The alarm assembly can comprise a durable circular buzzer.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

Implementations, features, and aspects of the disclosed technology are described in detail herein and are considered a part of the claimed disclosed technology. Other implementations, features, and aspects can be understood with reference to the following detailed description, accompanying drawings, and claims. Wherever possible, the same reference numbers are used throughout the drawings to refer to the same or like elements of an embodiment. Reference will now be made to the accompanying figures and flow diagrams, which are not necessarily drawn to scale.

FIG. 7A illustrates the swinging door closed, where FIG. 7B illustrates the swinging door being attempted to be opened and secured, and where FIG. 7C illustrates inserts positioned between the terminus ends and a portion of the door frame.

DETAILED DESCRIPTION OF THE INVENTION

Figure 1:
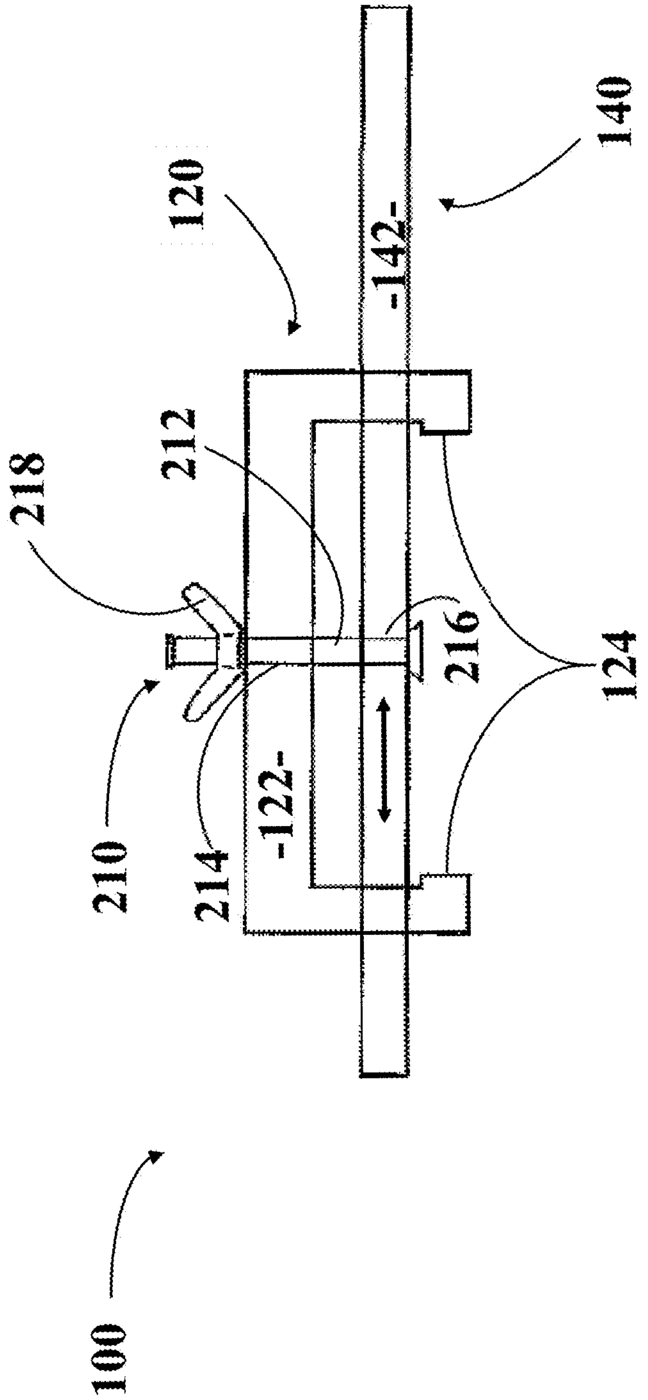
FIG. 1 is a schematic side view of the present invention according to an exemplary embodiment.

Although preferred exemplary embodiments of the disclosure are explained in detail, it is to be understood that other exemplary embodiments are contemplated. Accordingly, it is not intended that the disclosure is limited in its scope to the details of construction and arrangement of components set forth in the following description or illustrated in the drawings. The disclosure is capable of other exemplary embodiments and of being practiced or carried out in various ways. Also, in describing the preferred exemplary embodiments, specific terminology will be resorted to for the sake of clarity.

As used in the specification and the appended claims, the singular forms "a," "an" and "the" include plural referents unless the context clearly dictates otherwise.

Also, in describing the preferred exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another exemplary embodiment includes from the one particular value and/or to the other particular value.

Using "comprising" or "including" or like terms means that at least the named compound, element, particle, or method step is present in the composition or article or method, but does not exclude the presence of other compounds, materials, particles, method steps, even if the other such compounds, material, particles, method steps have the same function as what is named.

The present invention is an improved security system 100 comprising a frame connection assembly 120, a slidable extension assembly 140, and an alarm assembly 160 that presents the user with an alarm when unauthorized entry is attempted.

The present invention is an improved security system 100 for an entrance barrier, such as, but not limited to a door D, doors or door-like structured comprising the removable and portable door frame connection assembly 120 that releasably secures the system 100 to the jamb 180 of an entryway. The slidable extension assembly 140 is configured to span an adequate distance to interrupt door opening.

Figure 2:
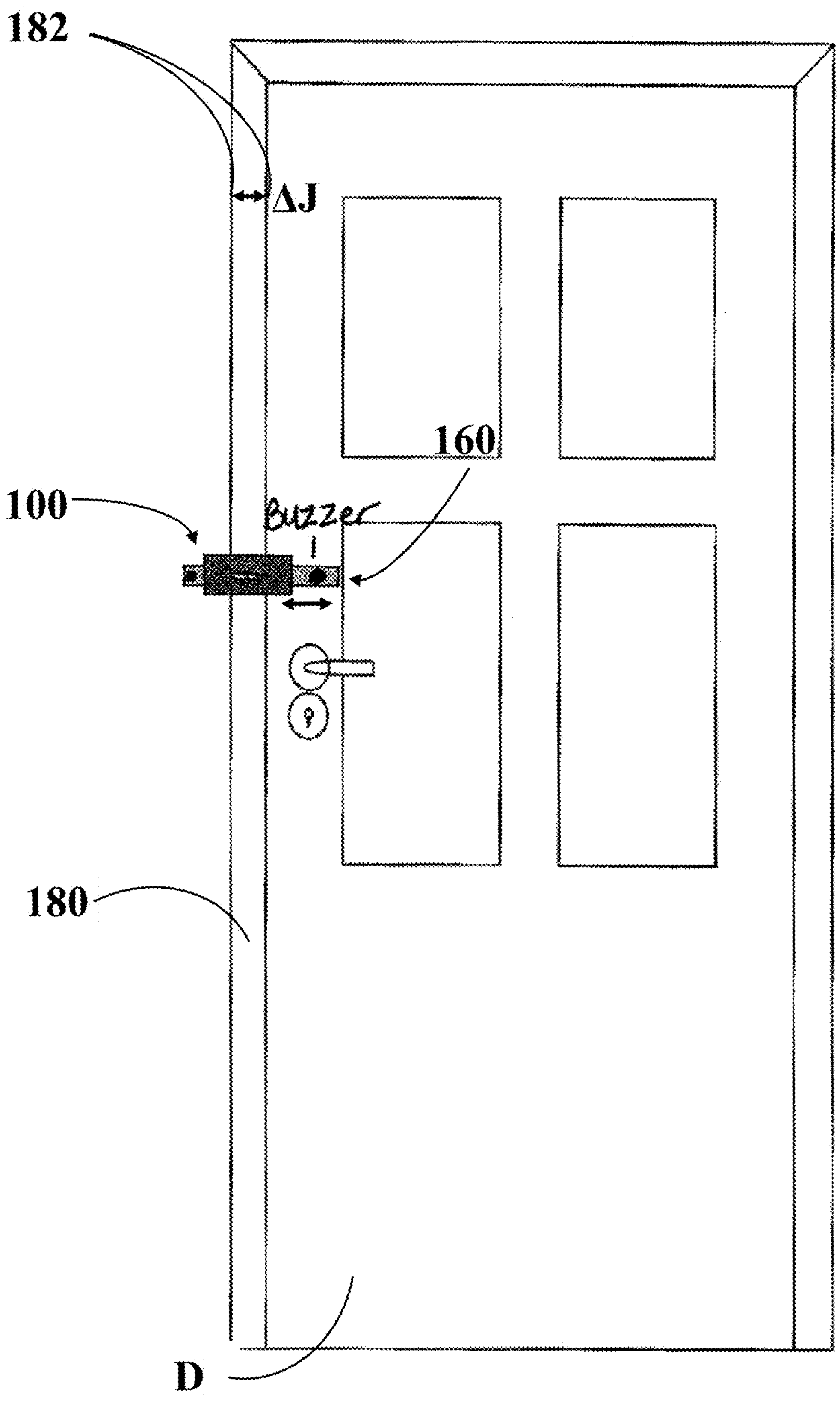
FIG. 2 illustrates an environment with which the present invention can be used, being a swinging door, where the view is from within a room into which the door opens.

The frame connection assembly 120 comprises a generally bracket configuration 122 with terminus ends 124 that are cooperatively shaped and aligned to contact the door jamb 180 at the edges 182 of the door jamb J, that are an extended edge (into the room as shown in FIG. 2). The width ΔJ of the door jamb J is variable according to a specific door, but the present invention is designed so the distance between the terminus ends 124 enable the comfortable, but removably secured alignment of the door frame connection assembly 120 to the door jamb 180.

The slidable extension assembly 140 comprises a slideable element 142 moveably generally in the lateral direction illustrated by the arrow. The amount of extension (left or right) of the slideable element 142 vis-à-vis the frame connection assembly 120 is releasably lockable by a lockable adjustment assembly 210. In the embodiment of FIG. 1, the lockable adjustment assembly 210 comprises a threaded element 212 endable through cooperative apertures 214, 216 in the bracket 122 and slideable element 142, respectively, and secured via a wing nut 218. The lockable adjustment assembly 210 can comprise numerous ways to lockable secure the extension of the slideable element 142 covering the door D. For example, the bracket 122 can comprise more than one through aperture 214 and/or the slideable element 142 can comprise more than one through aperture 216, so that the "relative" lateral adjustment of the slideable element 142 to the bracket 122 can be adjusted.

Figure 4:
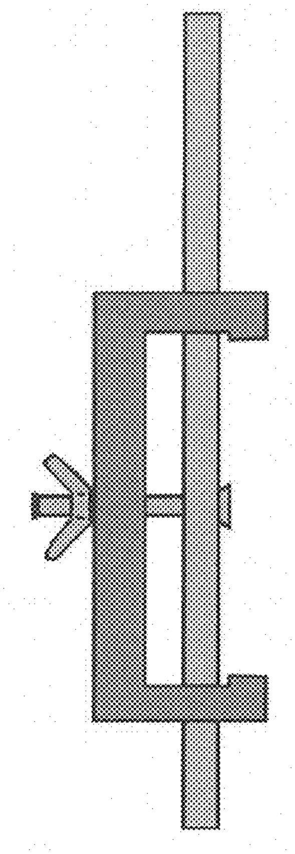
FIGS. 3-4 are schematic side views of the present invention according to another exemplary embodiment.
Figure 3:
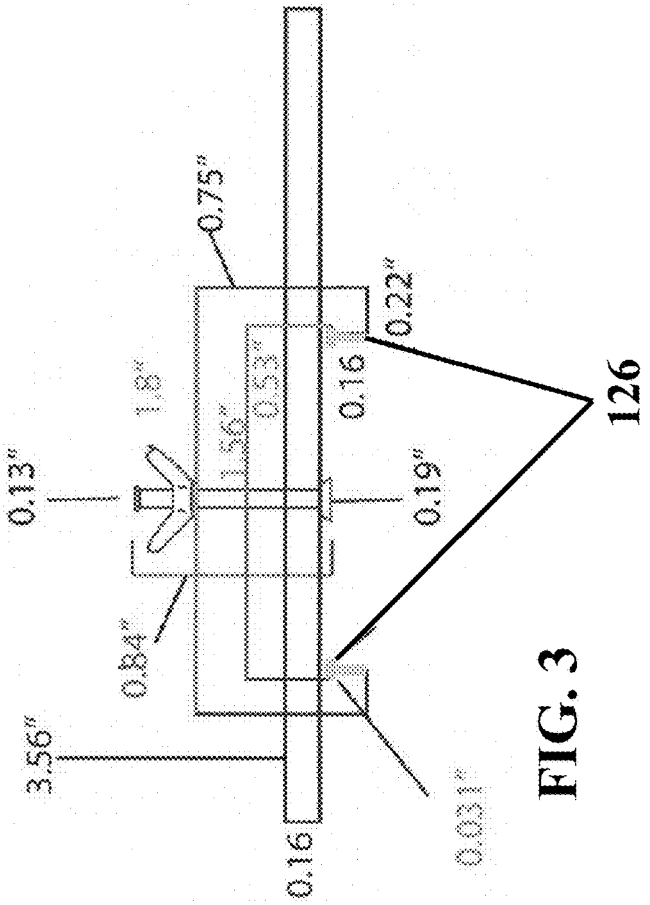

FIGS. 3-4 illustrate a set of inserts 126 that can be used between the terminus ends 124 and the edges 182 of the door jamb J that are useful to avoid damage to the door jamb J by the present invention 100. FIG. 3 also illustrates exemplary dimensions of the various elements of the present invention 100.

Figure 6:
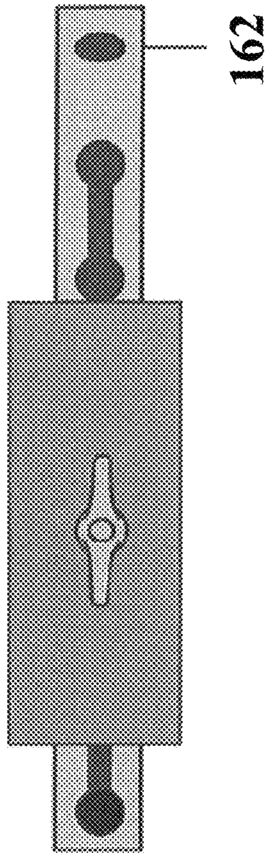
FIGS. 5-6 are schematic top views of the present invention shown in FIGS. 3-4.
Figure 5:
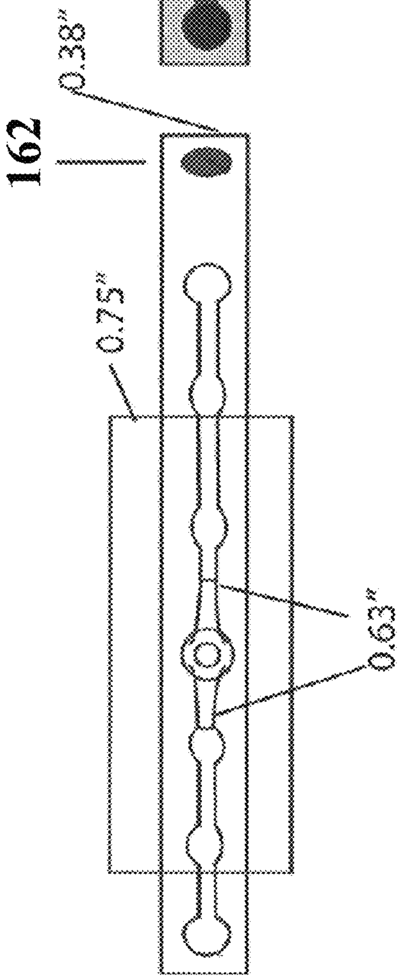
Figure 7A:
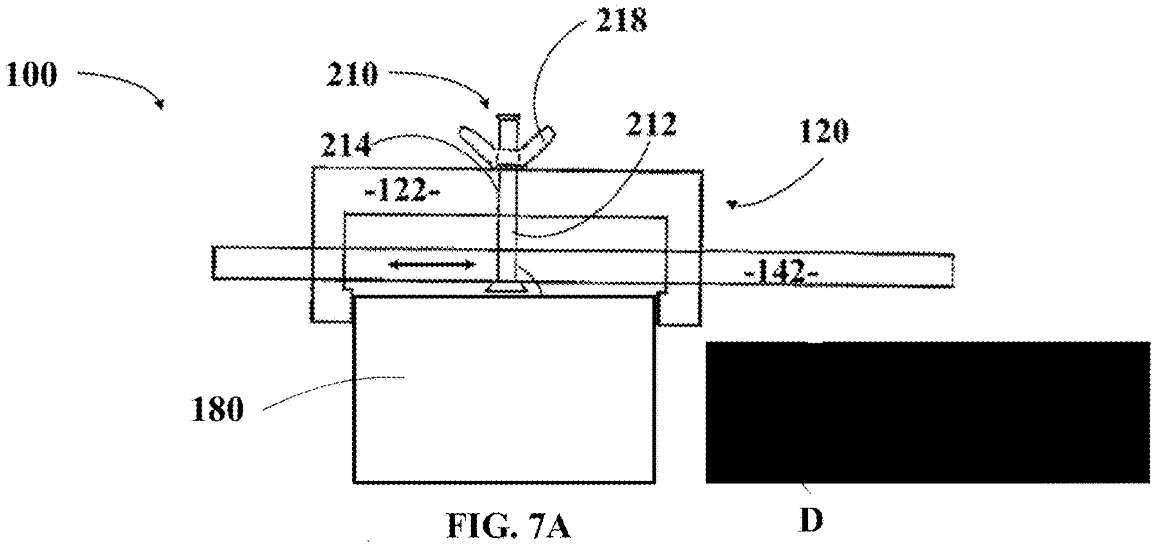
FIGS. 7A-7C illustrate an environment with which the present invention as shown in FIG. 1 can be used, being a swinging door, where the view is a side view, where
Figure 7B:
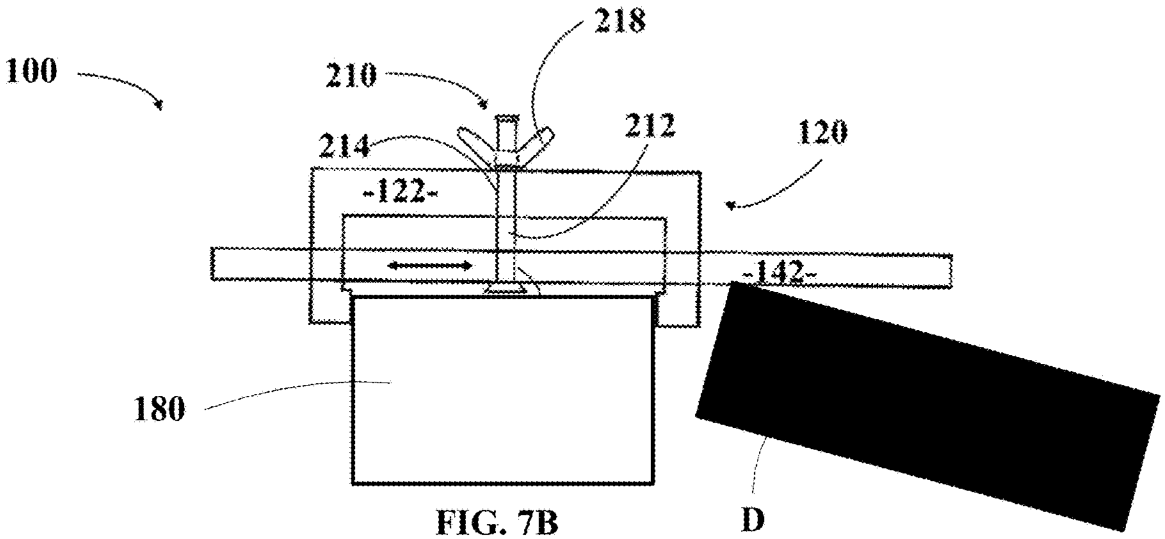
Figure 7C:
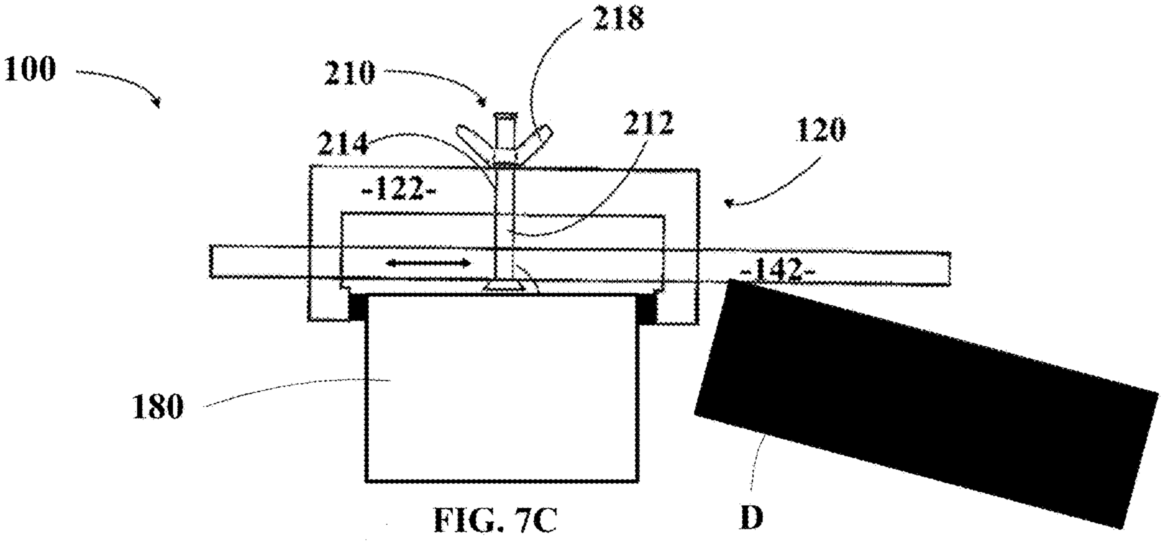

FIGS. 5-6 illustrate examples more clearly showing the embodiment where a plurality of apertures in the slideable element 142 are used with a single aperture of the frame connection assembly 120 for the locking of the invention 100. FIG. 5 also illustrates exemplary dimensions of the various elements of the present invention 100.

FIGS. 5-6 also illustrate an embodiment where the alarm assembly 160 comprises a buzzer 162 that presents the user with an alarm when unauthorized entry is attempted.

In an exemplary embodiment of the present invention, a lock system comprises a durable cylindrical boxed shape body, a wing nut, a screw used as a stabilizer for the device, an elongated sliding extension bar with holes, right and left side lip or gripper with gel inserts or coverings, wherein the head of screw can be used as a stopper, and a durable small circular buzzer.

It can be a removable lock system that has a durable cylindrical body having a box shape with four straight edges that can be used to attach to the door frame as a second line of security when traveling. The wing nut can be used to tighten down on the screw that secures the horizontal bar to the base when mounting to the door frame. The screw can be used as a stabilizer to tighten or secure the body of the device when mounting to the door frame.

The elongated sliding extension bar with holes can be used to keep the door from opening when mounted. The holes on the bar are used to allow the bar to freely pass or slide back or forth to the bar desired position before being locked in place. The right and left side lip or gripper with gel inserts or coverings are used to hold the body of the device in place to prevent unauthorized entry without damage to the doorframe. The gel inserts and the coverings could be disposable or reusable allowing the consumer the option to choose which would work best for their needs at the time.

The head of the screw can be used as a stopper to prevent the wing nut from separating from the screw stabilizer when mounting to door frame. This feature prevents the wing nut from separating from the unit. The body of the screw can be not only used to tighten the bar in place when fitted, but also can be used to tighten the lips to the body of the door frame as well as to stabilize the entire unit when mounting.

The buzzer can be a small durable circular piece of plastic that can be attached to the end of the elongated sliding bar that makes a high-pitched sound when contact is made with the door once mounted to the door frame.

The present system can be used as an added layer of security on the inside of a door frame. The device can be an additional lock placed on the door panel that has a durable small circular plastic buzzer to alert the occupants of unauthorize entry when contact is made between the buzzer and the door when in operation in one embodiment of the device. This requires no modification of the door or door frame to which it is applied.

When in one embodiment the device can be durable, removable and lightweight device that can travel with you to different locations such as hotels, motels, dorm rooms, schools, daycares, and anywhere someone would feel the need for extra security. This device would give parents an added sense of security when their children or family members are away from home. It would give college students an added sense of security in dorms as well as those living in apartments off campus. This device could be used by anyone that would like a second line of security to the primary door locks.

This device can also remain mounted to the door frame for everyday use or never removed if used as a permanent second line of security. The present invention can be described in enabling detail in the following examples, which may represent more than one embodiment of the present invention.

The system is a unique locking device that can be used as an added layer of security on the inside of a door frame. The present invention can be a removable lock that can be placed on the door panel that has a buzzer that can be a small durable circular piece of plastic to alert the occupants of unauthorize entry when contact is made between the buzzer and the door when in operation. This requires no modification of the door or door frame to which it is applied. This does not require special mounting to cause damage to the door frame because this device has disposable or reusable gel inserts or coverings to protect the frame of the door when mounting. The small durable plastic buzzer can be hidden out of view once the device can be engaged for use. The lock can be used regardless of any gaps in the door because it is attached to the door frame in one embodiment of the device.

When in one embodiment the device can be removable and lightweight that can travel with you to different locations such as hotels, motels, dorm rooms, schools, daycares, and anywhere someone would feel the need for extra security. This device would give parents an added sense of security when their children or family members are away from home. It would give college students an added sense of security in dorms as well as those living in apartments off campus. This device could be used by anyone that would like a second line of security to the primary door locks when traveling away from home. This device is user friendly because it has no removable pieces from the body of the device. The device can be one complete unit.

Mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lock system for a closure having a first side hingedly connected to a first side of a door frame of an entryway, the lock system comprising:

a frame connection assembly comprising at least one aperture and terminus ends;

an insert;

a slidable extension assembly;

a lockable adjustment assembly; and an alarm assembly;

wherein:

upon mounting the lock system to a second side of the door frame of the entryway in proximity to a second side of the closure opposite the hingedly connected first side, the lock system is detachably connected to the second side of the door frame via, on a first side, contact between one of the terminus ends of the frame connection assembly and the second side of the door frame, and on a second side, contact between the insert positioned between the other of the terminus ends and the second side of the door frame;

the slidable extension assembly comprises a laterally elongate extension bar with apertures located along at least a portion of a full length of the laterally elongate extension bar, wherein the full length of the laterally elongate extension bar is shorter than a width of the closure;

the lockable adjustment assembly is configured to lock a relative lateral position of the elongate extension bar with the frame connection assembly, whereupon the lock system is mounted for use to prevent an unauthorized movement of the closure in an opening direction;

the alarm assembly is configured such that the alarm assembly is hidden out of view once the lock system is mounted for use;

the slidable extension assembly is configured to span a distance in proximity to the second side of the door frame and the second side of the closure to interrupt the entryway's closure in the opening direction;

the relative lateral position of the elongate extension bar is defined by an alignment of one aperture of the frame connection assembly with one aperture of the laterally elongate extension bar through which a portion of the lockable adjustment assembly extends through the aligned apertures; and the alarm assembly is further configured to provide an alarm with an unauthorized movement of the closure in the opening direction.

2. The lock system of claim 1, wherein the closure is a door.

3. The lock system of claim 1, wherein the first side of the door frame comprises a jamb; and wherein the door is hingedly connected to the jamb.

4. The lock system of claim 1, wherein the opening direction is a direction into a room.

5. The lock system of claim 1, wherein the lockable adjustment assembly comprises a screw and wingnut, the screw extendible through the aligned apertures.

6. The lock system of claim 1, wherein no portion of the frame connection assembly is in contact with the closure.

7. The lock system of claim 1, wherein the insert comprises gel.

8. The lock system of claim 1, wherein the alarm assembly comprises a durable circular buzzer.

9. The lock system of claim 1, wherein the insert is a disposable or reusable gel insert configured both to detachably connect the lock system to the second side of the door frame and to protect the portion of the door frame from damage that would otherwise contact the other of the terminus ends of the frame connection assembly that has the insert positioned between the other of the terminus ends and the second side of the door frame.

10. The lock system of claim 1, wherein the frame connection assembly is mount-free of the closure.

11. A lock system for a closure having a first side hingedly connected to a first side of a door frame of an entryway, the lock system comprising:

a frame connection assembly comprising at least one aperture and terminus ends;

two inserts;

a slidable extension assembly; and a lockable adjustment assembly;

wherein:

upon mounting the lock system to a second side of the door frame of the entryway in proximity to a second side of the closure opposite the hingedly connected first side, the lock system is detachably connected to the second side of the door frame via, on a first side, contact between a first insert of the inserts positioned between a first terminus end of the terminus ends and the second side of the door frame, and on a second side, contact between a second insert of the inserts positioned between a second terminus end of the terminus ends and the second side of the door frame;

the slidable extension assembly comprises a laterally elongate extension bar with apertures located along at least a portion of a full length of the laterally elongate extension bar, wherein the full length of the laterally elongate extension bar is shorter than a width of the closure;

the lockable adjustment assembly is configured to lock a relative lateral position of the elongate extension bar with the frame connection assembly, whereupon the lock system is mounted for use to prevent an unauthorized movement of the closure in an opening direction;

the slidable extension assembly is configured to span a distance in proximity to the second side of the door frame and the second side of the closure to interrupt the entryway's closure in the opening direction; and the relative lateral position of the elongate extension bar is defined by an alignment of one aperture of the frame connection assembly with one aperture of the laterally elongate extension bar through which a portion of the lockable adjustment assembly extends through the aligned apertures.

12. The lock system of claim 11, wherein the frame connection assembly is mount-free of the closure.

13. The lock system of claim 11 further comprising an alarm assembly configured:

such that the alarm assembly is hidden out of view once the lock system is mounted for use; and to provide an alarm with an unauthorized movement of the closure in the opening direction.

14. The lock system of claim 11, wherein no portion of the frame connection assembly is in contact with the closure.

15. The lock system of claim 11, wherein each insert is a disposable or reusable gel insert configured both to detachably connect the lock system to the second side of the door frame and to protect the portion of the door frame from damage that would otherwise contact the respective terminus end of the frame connection assembly that each has a respective insert positioned between the respective terminus end and the second side of the door frame.

16. The lock system of claim 11, wherein the inserts comprise gel.

17. The lock system of claim 11, wherein the lockable adjustment assembly comprises a screw and wingnut, the screw extendible through the aligned apertures.

18. The lock system of claim 13, wherein the alarm assembly comprises a durable circular buzzer.

19. The lock system of claim 11, wherein:

the closure is a door;

the first side of the door frame comprises a jamb;

the door is hingedly connected to the jamb; and the opening direction is a direction into a room.

* * * * *